United States Patent [19]

Bruchon, Jr.

[11] Patent Number: 4,704,038
[45] Date of Patent: Nov. 3, 1987

[54] HANGER BEARING
[75] Inventor: Paul E. Bruchon, Jr., Belmont, N.C.
[73] Assignee: Sherrill Industries, Inc., Gastonia, N.C.
[21] Appl. No.: 385,519
[22] Filed: Jun. 7, 1982
[51] Int. Cl.[4] ............................................. F16C 33/08
[52] U.S. Cl. .................................................... 384/443
[58] Field of Search ............... 384/428, 437, 443, 444; 403/153, 154; 411/500, 504

[56] References Cited

U.S. PATENT DOCUMENTS

| 2,847,238 | 8/1958 | Bolling, Jr. | 403/154 |
| 3,112,963 | 12/1963 | Cardwell | 384/443 X |
| 3,709,571 | 1/1973 | Croisant et al. | 384/443 |
| 3,820,860 | 6/1974 | Stone | 384/428 |

Primary Examiner—Stuart S. Levy
Assistant Examiner—David Werner
Attorney, Agent, or Firm—Clifton Ted Hunt

[57] ABSTRACT

A contoured pin extends from a correspondingly shaped opening in the wall of a hanger bearing in registry with a space in the hanger to engage the hanger and prevent undesirable rotation of the bearing by the rotatable shaft journaled in the bearing. The contour of the pin and the shape of the opening locks the pin in the bearing when mounted about a shaft.

2 Claims, 7 Drawing Figures

U.S. Patent  Nov. 3, 1987  4,704,038
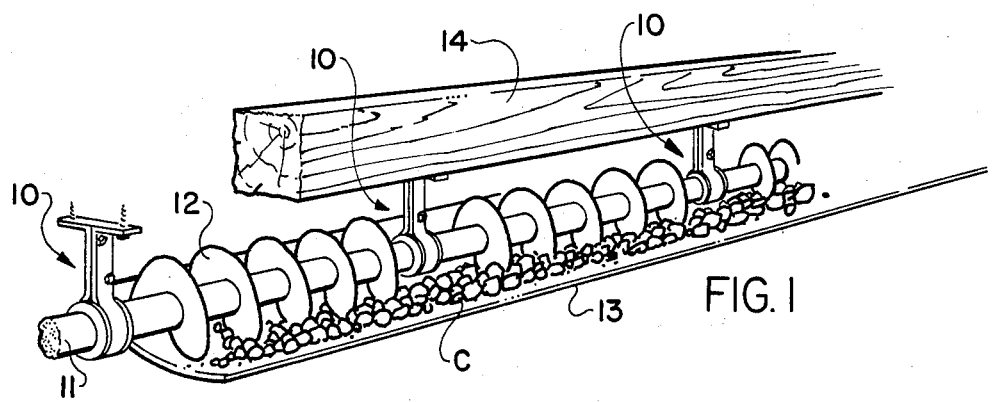
FIG. 1
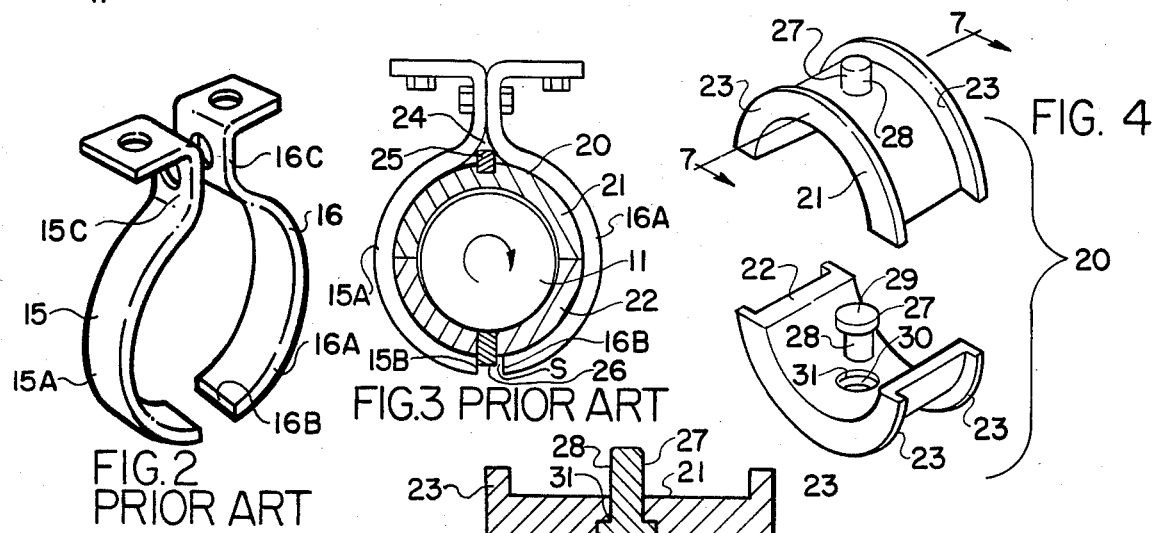
FIG. 2 PRIOR ART
FIG. 3 PRIOR ART
FIG. 4
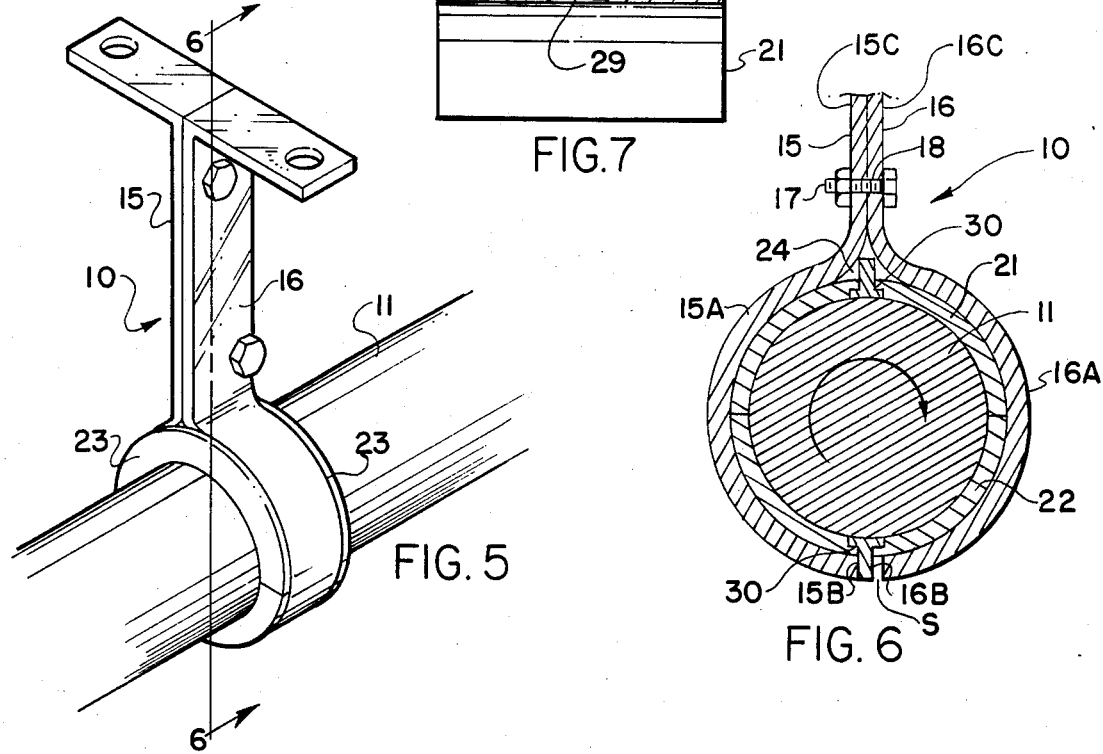
FIG. 7
FIG. 5
FIG. 6

4,704,038

HANGER BEARING

BACKGROUND OF THE INVENTION

Rotating shafts such as used in screw conveyers, for example, are supported at spaced intervals along their length by metal clamps, each clamp including a pair of metal straps having a curved portion to each fit about one-half the circumference of the pipe and a straight portion extending upwardly from the curved portion and laterally extending end portions diverging from each other and having holes to receive bolts for attachment to the support frame. A split bearing which may be made of wood or plastic, is positioned about the shaft and within each clamp and the shaft is journaled within the bearings for rotation.

Rotation of the shaft tends to impart corresponding rotation to the bearings within the clamps and this tendency of the bearings to rotate is objectional because of the excessive wear on the bearings. It has heretofore been the practice to insert pins within the bearing extending radially therefrom and engagable with opposed portions of the clamp to prevent rotation of the bearing when the shaft is rotated.

Metal pins have heretofore been used but have proven objectional because as normal wear reduces the thickness of the bearing wall, the metal pin contacts the shaft and tends to wear an undesirable groove into the shaft.

Bearings have been molded with projections or lugs as integral parts of the bearing to engage the hanger or clamp and prevent rotation of the bearing but in some instances it is desired to machine the projection or pin as when the properties of ultra-high molecular weight polyethylene are desired. The invention is useful for any material which is used in machining the stabilizing pin, and in any application where there is a need for a separate pin (which cannot be molded without losing some of its desirable properties, such as impact resistance) rather than a molded lug, as for example in a wooden bearing.

The straight nylon pins and pins made from ultra-high molecular weight polyethylene heretofore used to prevent undesirable rotation of the bearing have proven objectional because they have a tendency to eject from the bearing as when the bearing seizes on the shaft or otherwise experiences an abrupt movement.

SUMMARY OF THE INVENTION

The invention contemplates the mechanical retention in the bearing of a contoured pin made from nylon, ultra high molecular weight polyethylene or other material which will satisfactorily retain the bearing from rotation and which will not adversely groove or wear the steel shaft. In the illustrated embodiment of the invention, the tendency of the pin to eject from the bearing is overcome by providing a shouldered configuration to the pin and a corresponding counterbore in the bearing. Such a structure mechanically prevents the pin from moving outwardly through the bearing, and of course, the shaft prevents the pin from moving inwardly relative to the bearing.

Other configurations which will prevent the pin from moving outwardly relative to the bearing include an outwardly tapered opening through the bearing for reception of a correspondingly tapered pin; and a threaded pin provided with a slot at one end as in a conventional screw threadably engaged in a threaded opening in the bearing.

BRIEF DESCRIPTION OF THE DRAWINGS

FIG. 1 is a perspective view of a screw conveyer supported by spaced clamps about a rotating shaft and illustrating an environment of the invention;

FIG. 2 is a perspective view of a clamp formed from a pair of metal straps according to the prior art and as used in the present invention;

FIG. 3 is an end view, partially in section, of a clamp extending about a bearing and supporting a rotating shaft, and illustrating the prior art pins used to prevent rotation of the bearing;

FIG. 4 is an exploded view of a bearing illustrating the contoured pin of the present invention;

FIG. 5 is a perspective view of a rotatable shaft journaled in a bearing and supported by a clamp;

FIG. 6 is a vertical sectional view taken substantially along the Line 6—6 in FIG. 5; and FIG. 7 is a sectional view taken substantially along the Line 7—7 in FIG. 4.

DETAILED DESCRIPTION OF THE INVENTION

Referring more specifically to the drawings, the numeral 10 broadly indicates a clamp for a rotatable shaft 11. In the illustrated embodiment, the shaft 11 has a plurality of vanes or enlarged threads 12 arranged in a spiral formation about the shaft to serve as a conveyer for granular material such as coal C supported on an apron 13. A plurality of support assemblies 10 are spaced along the length of the shaft 11 and extended between the shaft and an overhead frame or beam 14.

Each clamp 10 comprises a pair of metal straps 15 and 16 curved toward each other at corresponding ends of the straps to define arcuate portions 15A and 16A extending circumferentially about the pipe 11. The arcuate portions 15A and 16A terminate at 15B and 16B in spaced relation to each other, defining a space S therebetween (FIG. 6). The straps 15 and 16 also include straight portions 15C and 16C extending from the arcuate portions 15A and 16A opposite the spaced ends 15B, 16B. The straight portions 15C, 16C are held in engagement with each other by a bolt and nut assembly 17 extending through registrable openings 18 in the straight portions 15C, 16C. Laterally extending end portions 15D and 16D diverge from each other as shown in FIG. 5, and are provided with openings to receive bolts or screws for attachment to the overhead frame 14.

A split bearing 20 includes arcuate bearing portions 21 and 22 shaped and sized to fit snugly between the arcuate portions 15A and 16A of the clamp 10 and circumferentially about the rotatable shaft 11. The bearing portions 21, 22 extend about the upper and lower halves of the shaft 11 and terminate in a plane passing through the arcuate portions 15A and 16A of the clamp 10. Flanges 23 may be provided on the bearing portions 21, 22 to extend over the edges of the arcuate portions 15A, 16A of the clamp 10 to limit axial movement of the bearing relative to the clamp 10.

Tightening of the nut and bolt assembly 17 causes the arcuate portions 15A, 16A to clamp about the bearing portions 21, 22 and the shaft 11. When tightened as shown in FIG. 6, the upper straight portions 15C and 16C are in snug engagement with each other and the arcuate portions 15A and 16A are in snug engagement with the bearing portions 21, 22, creating a gap or opening as at 24 at the juncture of the straight portions 15C, 16C with the arcuate portions 15A, 16A.

Rotation of the shaft 11 tends to create corresponding rotation of the bearing 20 and this has been prevented in the prior art (FIG. 3) by providing either a metal or plastic pin 25 extending into the gap 24 and/or the space between the ends 15B, 16B of the straps 15, 16. Normal wear of the bearing 20 through rotation of the shaft 11 results in the metal pin 25 contacting the shaft 11 and undesirably grooving or marring the shaft. The prior art has recognized this problem and has dealt with it by providing a plastic pin illustrated at 26 in FIG. 3 in the space S between the ends 15B, 16B and/or in the gap 24 at the juncture of the straight portions 15C, 16C with the arcuate portions 15A, 16A. The bearing halves 21 and 22 are made from plastic, wood or metal and in any event the plastic pins 26 tend to be easily ejected from the bearing through the space S or opening 24 when the shaft 11 is subjected to vibration or seizure, even temporary, of the bearing on the shaft.

According to the present invention, a contoured pin 27 made of ultra high molecular weight polyethylene or other suitable material may be provided of a T-shaped configuration including a body portion 28 and a head 29. Each bearing portion 21 and 22 has a counterbored opening 30 defining a shoulder 31 in its wall and registrable with the space S or the space 24.

In practice, the body portion 28 of the pin 27 is passed through the opening 30 from the inside of the bearing portion and the body portion 28 of the pin 27 extends through the smaller portion of the opening 30 with the head 29 engaging the shoulder 31 to prevent further outward movement of the pin 27 relative to the bearing. The body portion 28 of the pin 27 extends into the gap 24 at the juncture of the metal straps and into the space S between the ends of the straps and engages the straps 15 and 16 as the shaft 11 is rotated in a clockwise direction in FIG. 6. Engagement of the strap 15 by the pin 27 prevents undesirable rotation of the bearing 20.

It is within the spirit of the invention to utilize other shapes of pins and openings to prevent outward movement of the pin relative to the bearing, such as a threaded pin passing through a threaded opening or a tapered pin passing through an outwardly tapered opening. Any shaped opening and configuration of pin that mechanically prevents the pin from ejecting outwardly in use is satisfactory and is defined in the claims as a contoured pin and a corresponding shaped opening in the bearing.

Although specific terms have been employed in the specification and drawings, they are used in a descriptive sense and not for purposes of limitation.

I claim:

1. A hanger for a rotatable shaft supported by at least one clamp having a pair of straps circumferentially joined together about the bearing and defining spaces between the straps at their juncture with the bearing, said bearing being formed of non-moldable material extending circumferentially about the shaft, a portion of the bearing proximate a first space between the straps have a radially extending opening therethrough registrable with said first space between the straps and counterbored at its inner end to define a larger diameter inner portion and a shoulder within the opening, and a headed pin extending outwardly through the opening and into the said first space between the straps with the head of the pin seated in the larger diameter inner portion of the opening and engageable with the shoulder.

2. A structure according to claim 1 wherein the non-moldable bearing is formed in two halves each extending semi-circumferentially about the shaft, each half of the bearing proximate to a space between the straps having a radially extending opening therethrough registrable with the space and counterbored to define a larger diameter inner portion and a shoulder within the opening, and a headed pin extending outwardly through each opening and into the proximate space between the straps with the heads of the pins seated in the larger diameter inner portions of the openings and engageable with respective shoulders.

* * * * *